March 16, 1937.  J. BODNOVICH  2,073,727
VALVE
Filed Nov. 8, 1935  2 Sheets-Sheet 1
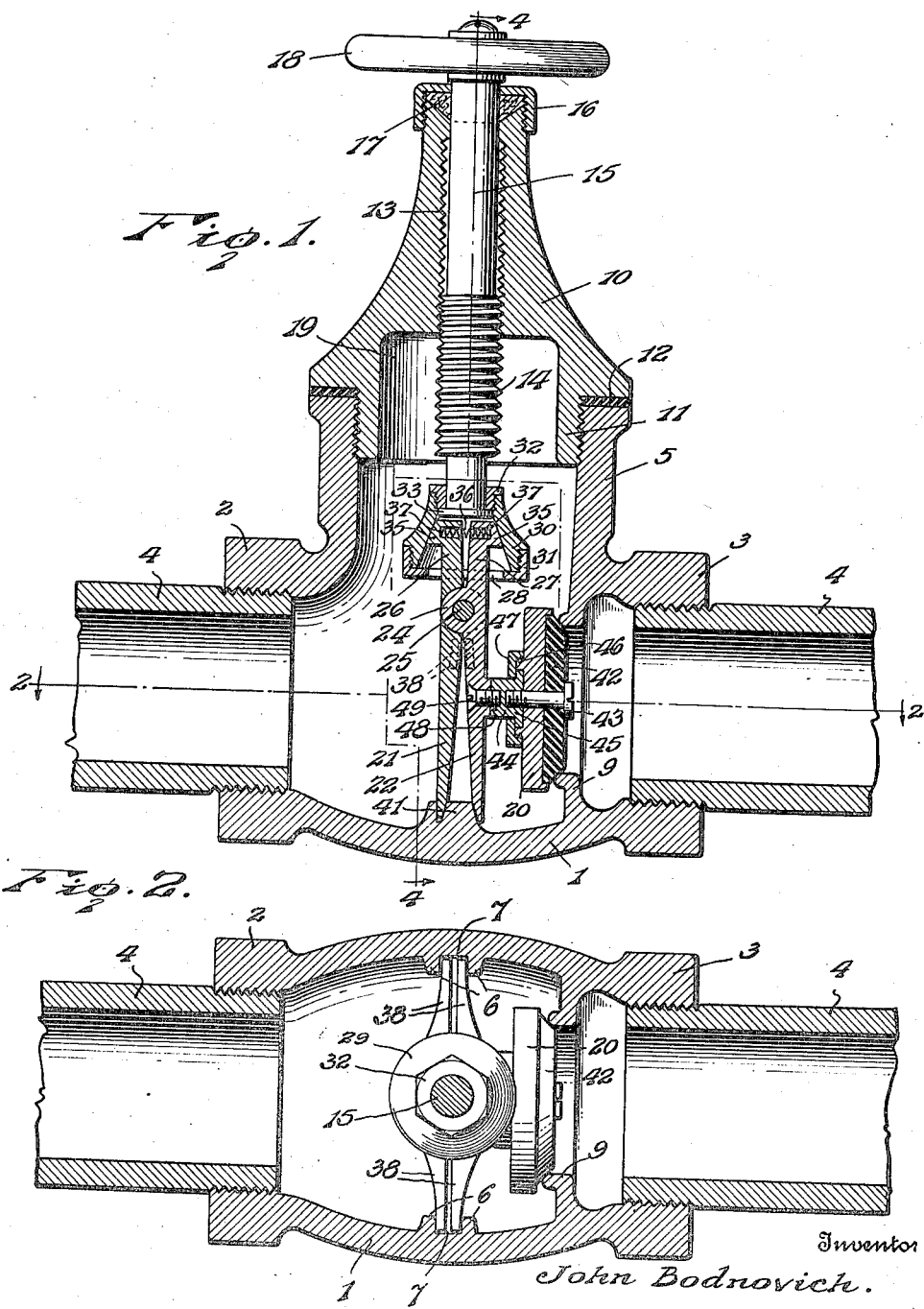
Inventor
John Bodnovich.
By Lacy & Lacy, Attorneys March 16, 1937.   J. BODNOVICH   2,073,727
VALVE
Filed Nov. 8, 1935   2 Sheets-Sheet 2

Inventor
John Bodnovich.
By Lacey & Lacey,
Attorneys

Patented Mar. 16, 1937

2,073,727

UNITED STATES PATENT OFFICE 2,073,727

VALVE

John Bodnovich, West Palm Beach, Fla., assignor of forty-nine per cent to Edward C. Hilker, West Palm Beach, Fla.

Application November 8, 1935, Serial No. 48,924

9 Claims. (Cl. 251—58)

This invention relates to a valve of the type employed to control flow of water, gas and other fluid through a pipe line, and one object of the invention is to so construct the valve that the gate or barrier may be moved from a lowered position in which it has abutting engagement with a seat and shuts off flow of fluid through the valve to a raised position where it will be out of the way and permit free flow of fluid through the valve.

Another object of the invention is to so form the improved valve that in some respects it resembles a globe valve and in others a gate valve, the stem being threaded through a bonnet and improved means being provided for connecting a valve disc with the stem and causing the disc to have vertical movement into and out of position for engagement with a seat in the valve casing and also movement longitudinally of the valve casing into and out of abutting engagement with the valve seat.

Another object of the invention is to so construct and mount the carrier for the valve disc that pivotally connected arms forming the carrier may be shifted vertically in the valve casing without moving out of a position in which the valve disc is disposed in facing relation to the valve seat and pivotal movement imparted to the arms when in a lowered position to move the valve disc longitudinally of the valve casing into position to make contact with the valve seat and form a tight closure to prevent flow of fluid through the valve.

Another object of the invention is to so construct the valve casing and bonnet that vertical movement of the valve stem and valve disc carrier will not be interfered with when shifted upwardly and removal of the hood, together with the stem and disc carrier and disc permitted in order that repairs and adjustments may be easily made.

The invention is illustrated in the accompanying drawings, wherein

Figure 1 is a vertical sectional view taken longitudinally through the improved valve.

Figure 2 is a horizontal sectional view taken longitudinally through the valve upon the line 2—2 of Figure 1.

Figure 3:
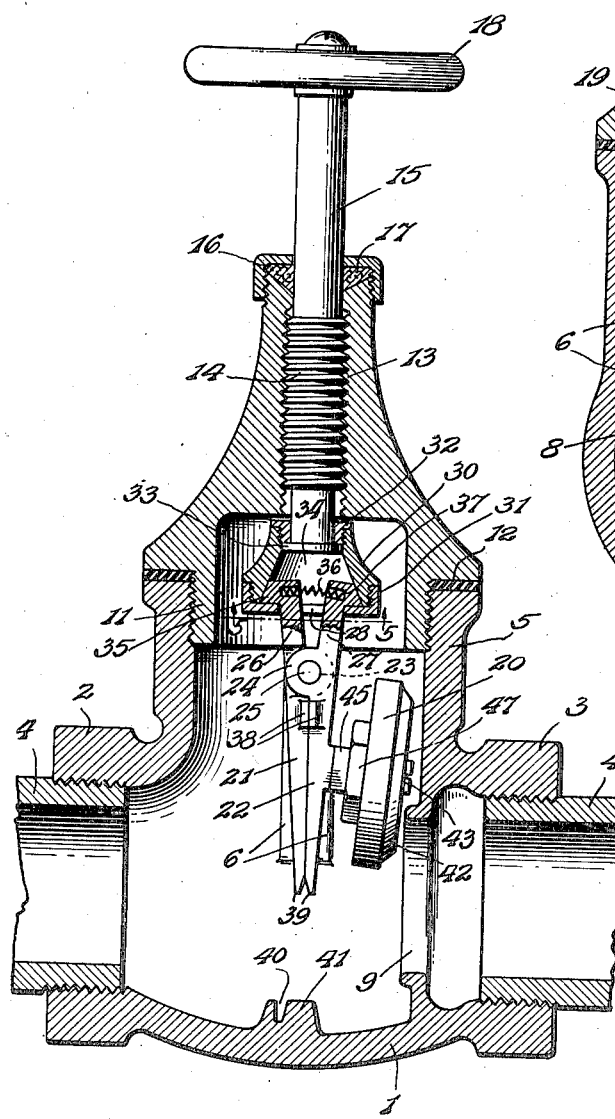
Figure 3 is a view similar to Figure 1 showing the valve opened.

The casing 1 of this improved valve has the external appearance of a globe valve and at its ends has its body portion thickened and internally threaded, as shown at 2 and 3 for engagement with threaded ends of pipes 4 constituting portions of a pipe line through which water or other fluid passes. A neck 5 rises from the body portion of the valve between the end portions 2 and 3 and upon opposite side portions of the neck are formed vertically disposed ribs 6 which are spaced from each other, as shown in Figure 2, to provide grooves or tracks 7. Referring to Figure 4 it will be seen that the ribs extend vertically with their lower portions projecting downwardly below the neck into the body portion of the valve where they are formed integral with bosses 8 projecting inwardly from walls of the valve body. An annular valve seat 9 is formed in the casing adjacent the thickened end portion 3 and from an inspection of Figures 2 and 3 it will be readily seen that when the valve is opened, water or other fluid will move in a straight path through the casing. It should also be noted that the inner diameter of the valve seat 9 corresponds to the internal diameters of the pipes 4 and, therefore, flow of liquid through the valve casing will not be restricted.

Figure 4:
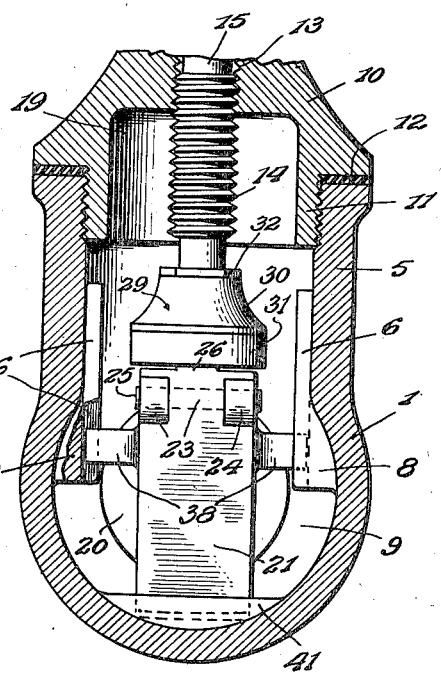
Figure 4 is a vertical sectional view taken transversely through the valve along the line 4—4 of Figure 1 with the upper portion of the bonnet and valve stem broken off.
Figure 5:
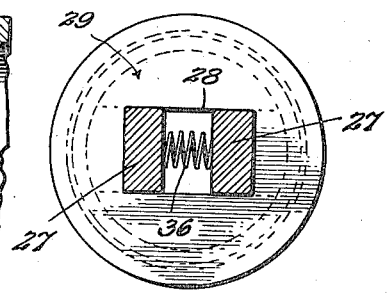
Figure 5 is a fragmentary sectional view taken along the line 5—5 of Figure 3.

The bonnet or hood 10 which tapers upwardly, as shown in Figures 1 and 3, has a reduced and externally threaded lower portion 11 which is screwed into the upper end of the neck 5 and a sealing gasket 12 is provided between the neck and bonnet to form a tight joint when the bonnet is screwed into place upon the neck. The bore 13 of the bonnet is threaded for engagement by the threaded portion 14 of the valve stem 15 and at its upper end the bonnet carries a packing gland 16 for compressing packing 17 about the valve stem and preventing leakage. It should be noted that the threaded portion of the bore terminates in spaced relation to the upper end of the bonnet thus limiting upward movement of the valve stem when the hand wheel 18 is grasped and turned in a direction to shift the stem upwardly. The lower end of the bore of the bonnet communicates with a pocket 19 which opens through the lower end of the bonnet and is formed concentric to the bore and of such depth that it projects well above the upper end of the neck 5 when the bonnet is in place.

In order to support a valve disc 20, there has been provided a carrier which may be referred to as a compound lever and consists of legs 21 and 22 having hinge ears 23 and 24 through which extend a pin 25 serving to pivotally connect the legs. Arms 26 and 27 formed by upper end portions of the levers project unwardly from the hinge ears and these arms extend through an elongated rectangular opening 28 formed in the bottom of a cup 29 which consists of companion sections 30 and 31, as shown clearly in Figures 1 and 3 and has a reduced and internally threaded upper end portion screwed onto the threaded shank of a collar 32 loosely engaged about the lower end of the valve stem. A flat disc-like head 33 at the lower end of the valve stem engages under the collar in the upper end portion of the cup 29, the head being of such thickness that when the cup and collar are screwed tightly into engagement with each other, the head will at all times be spaced from upper ends of the arms 26 and 27 and thus permit the valve stem to be turned freely without the cup and collar rotating with it. The hollow cup defines a pocket 34 which tapers upwardly, as shown in Figures 1 and 3, and the upper ends of the arms which project into this pocket terminate in heads 35 having beveled ends conforming to the taper of walls of the pocket 34 and held in contact with the sloping walls of the pocket by a spring 36 which extends between the upper ends of the arms with its end portions seated in recesses or pockets 37 formed in the arms. By this arrangement, the levers will be urged toward the position shown in Figure 3 in which they are in contact with each other but when the cup moves downwardly longitudinally of the levers to shift the heads 35 toward the upper end of the pocket, a cam action will take place between the beveled ends of the heads and the sloping walls of the arms to force the arms toward each other and turn the levers about the pivot pin 25 to the position shown in Figure 1. Side extensions or arms 38 project from opposite sides of the legs with their outer ends engaged in the grooves or tracks 7 and attention is called to the fact that the distance between the ribs forming the tracks is greater than the combined thicknesses of the outer ends of the arms 38, as shown in Figure 2, thus permitting the legs to have movement toward and away from each other with the arms engaged in the tracks. It should also be noted that lower ends of the legs have their confronting faces beveled, as shown at 39, so that when the lever is moved downwardly as the valve is closed, the lower end of the leg 21 may engage in the downwardly tapered groove 40 formed in the rib 41 extending transversely across the bottom of the valve casing and the lower end of the leg 22 engage the sloping side face of the rib which confronts the valve seat and a wedging action take place between the rib and the legs which will cause the legs to be spread by a cam action and force the gasket 42 of the valve disc 20 firmly against the valve seat 9. The gasket 42 is formed of rubber, compressed fiber or any other material ordinarily used for forming a sealing washer for a valve disc and is held against the valve disc by a screw 43 which passes through the washer and disc and is screwed into a threaded socket 44 formed in a mounting block 45. The block 45 fits against the valve disc at the opposite side thereof from the gasket or washer 42 and has an enlarged end portion surrounded by an externally threaded collar 46 carrying a cap nut 47 which when screwed tightly into place holds the block firmly against the valve disc. The outer end portion of the block is also formed with a threaded socket 48 to receive a screw 49 which passes through an opening formed in the leg 22 with its head countersunk as shown in Figure 1 in order that it will not interfere with movement of the legs toward each other to a position in which their inner side faces contact, as shown in Figure 3.

When this valve is in use, the pipes 4 are screwed into the threaded end portions 2 and 3 of the casing and when the valve is closed the valve disc carrier consisting of the companion levers is disposed in the lowered position shown in Figure 1 with lower ends of the legs 21 and 22 engaging the rib 41 so that the legs will be spread apart and the washer or gasket of the valve disc forced into firm engagement with the valve seat. During downward movement of the valve stem and the valve disc carrier, the heads 35 of the arms 27 remain at the bottom of the pocket 34 until lower ends of the legs engage the upper face of the rib and, therefore, the valve disc will be permitted to move downwardly to a position in which it confronts the valve seat. When lower ends of the legs strike the rib, the cup 29 and valve stem will move downwardly relative to the carrier and as the heads of the arms approach the upper end of the pocket 34, a cam action will take place between the walls of the pocket and the beveled ends of the heads to cause the legs of the levers to be spread to a position in which the lower end of the leg 21 may enter the groove 40 and the lower end of the leg 22 slide downwardly along the sloping face of the rib which faces the valve seat. Additional turning of the valve stem will apply pressure to force the levers downwardly and the gasket of the valve disc will be forced into tight engagement with the valve seat. When it is desired to open the valve, the stem is turned in a direction to move it upwardly and the cup will be drawn upwardly along the arms of the levers until the bottom of the cup makes contact with under faces of the heads 32. Pull will then be exerted to draw the carrier upwardly and loosen the lower ends of the legs from the disc. The spring 36 moves the arms of the levers away from each other until outer ends of the arms make contact with the sloping walls of the pocket in the cup, thus moving the legs toward each other to the position shown in Figure 3 and moving the valve disc away from the valve seat to a position in which the carrier and valve disc may be drawn upwardly to the fully opened position shown in Figure 3. When the valve is fully opened, the valve disc and the carrier will be disposed at such a height that water or other liquid can flow freely through the valve casing from one pipe to the other without interference or loss of pressure. If it is desired to clean the valve or make repairs or replacements, the bonnet is unscrewed from the neck of the valve casing and it can be easily removed therefrom, together with the carrier and valve disc. As the side arms of the levers remain in the tracks 7 during vertical adjustment for opening or closing of the valve, the valve disc will at all times be in facing relation to the valve seat and cannot move out of a position to have accurate contact between the washer 42 and valve seat when closed.

Having thus described the invention, what is claimed as new is:

1. A valve comprising a casing having inlet and outlet passages, an internal annular seat about the inner end of one passage, a hood carried by said casing, a stem adjustable longitudinally through the hood, a coupling depending from the inner end of said stem and shiftable in the casing with the stem from a raised position to a lowered position levers pivoted to each other and having arms slidable in said coupling, the coupling having a cam surface for acting upon the arm of one lever for moving the lever toward and away from the valve seat, and a valve carried by the last mentioned lever and facing the seat for seating thereon when the stem and coupling are in a lowered position.

2. A valve comprising a casing having inlet and outlet passages through its ends and a neck between its ends, an internal annular seat about the inner end of one passage, a hood carried by said neck, a stem extending through the hood and adapted for longitudinal adjustment, a carrier extending longitudinally from the inner end of the stem and consisting of levers having legs pivoted to each other and arms extending longitudinally of the legs, a valve carried by one leg and facing the seat, a coupling connecting the arms with the inner end of said stem and shiftable longitudinally of the arms with the stem, the coupling being loose about the stem, means to prevent turning of the carrier with the stem, and means for moving the levers when lowered to move the valve into engagement with the seat.

3. A valve comprising a casing having inlet and outlet passages through its ends, a neck rising from the casing between said passages, a hood carried by said neck, a stem threaded through said hood, an annular valve seat in said casing about the inner end of one passage, a coupling loose about the inner end of said stem and formed with a pocket tapered upwardly, a carrier formed of levers having legs pivoted to each other and arms extending upwardly into the pocket of said coupling and formed with heads engaging the sloping walls of the pocket, a valve carried by the leg of one lever in facing relation to the valve seat, cooperating means carried by the legs of the levers and walls of the casing for preventing turning of the carrier with said stem, and means at the bottom of the casing for holding the legs of the levers expanded with the valve pressed against the seat when the carrier is in a lowered position.

4. A valve comprising a casing having inlet and outlet passages and an upstanding neck, an annular valve seat about the inner end of one passage, a hood carried by and rising from said neck and formed with a pocket opening through its inner end and a threaded bore leading from the pocket through the upper end of the hood, a stem threaded through the bore of said hood with its inner end projecting into the pocket, a collar loose about the inner end of said stem, a cup carried by said collar and formed with a chamber tapered upwardly and having an opening at its bottom, a carrier consisting of levers pivoted to each other to provide legs movable toward and away from each other and arms extending upwardly from the legs into the chamber of said cup and terminating in heads formed with beveled end faces to bear against sloping walls of the chamber, a spring between said arms urging the heads into engagement with walls of the chamber and the legs of the lever toward each other, means to prevent turning of the carrier with the stem when the stem is rotated for vertical adjustment through the hood, and a valve member carried by the leg of one lever in facing relation to the valve seat and disposed in close contacting engagement with the valve seat when the carrier is moved to a lowered position.

5. A valve comprising a casing having opposed inlet and outlet passages, a threaded stem extending transversely of the casing intermediate the length thereof and shiftable longitudinally when turned, a coupling carried by the inner end of said stem, a carrier depending from the coupling in alinement with the stem and consisting of pivoted levers having arms slidable in the coupling and movable toward and away from each other, the arms and coupling having co-operating cam surfaces for moving the arms toward each other and swinging the levers away from each other when the coupling moves downwardly along the arms, tracks at opposite sides of said casing, arms extending from said levers and engaged in said tracks to prevent turning of the carrier with the stem, and a valve disc carried by one lever in facing relation to the valve seat and moved into contact with the seat to shut off flow of fluid through the casing when the levers are moved away from each other.

6. A valve comprising a casing having opposed pipe receiving passages, and an annular valve seat about the inner end of one passage, a hood carried by said casing, a stem threaded through the hood into the casing between the passages, a carrier in the casing in alinement with said stem and consisting of levers pivoted to each other intermediate their upper and lower ends, a coupling carried by the inner end of said stem and slidable upon upper end portions of said levers, the coupling and upper ends of said levers having cam faces for tilting the levers to move their lower ends away from each other when the coupling is slid downwardly upon the levers, tracks at opposite sides of the casing, arms extending from the levers and engaged in said tracks, a rib across the lower portion of said casing for engaging lower ends of the levers and holding the levers in a spread position, and a valve disc carried by one lever in facing relation to the seat and held firmly against the seat when the levers are in engagement with said rib.

7. A valve comprising a casing having opposed pipe receiving passages and a valve seat about the inner end of one passage, tracks at opposite sides of the casing intermediate the valve seat and the other passage, and a rib extending across the bottom of the casing under the tracks and formed with a sloping side face and a longitudinally extending groove in its upper face, a hood carried by said casing, a stem threaded through the hood into the casing, a coupling carried by the inner end of said stem, a carrier in alinement with the stem and consisting of pivotal levers having their upper ends engaged in the coupling, the coupling being loose about the stem and slidable along upper end portions of the levers and imparting tilting movement to spread lower ends of the levers when moved downwardly, arms extending from the levers and engaged in said tracks to prevent turning of the carrier with the stem, a valve disc secured to one lever in facing relation to said seat, and a gasket carried by the valve disc for bearing against the seat and forming a tight closure when the carrier is lowered and lower ends of its levers engaged in the groove and against the sloping side face of said rib to hold the levers spread.

8. A valve comprising a casing having opposed passages and a valve seat about the inner end of one passage, guides at opposite sides of the casing, a rib extending across the bottom of the casing, a hood carried by the casing, a stem threaded through the hood into the casing, a carrier connected with the inner end portion of the stem and adapted to be expanded toward the valve seat when the stem and carrier are moved downwardly and the lower end of the carrier engaged with said rib, a valve disc facing the valve seat, a block, a collar securing said block to said valve disc, a fastener detachably securing said block to said carrier, a facing gasket for the valve disc, and a fastener passing through the gasket and disc and engaged with the block to detachably hold the gasket in place.

9. A valve comprising a casing having a pipe receiving passage and a valve seat about the inner end of said passage, a longitudinally adjustable stem extending into said casing, a coupling suspended from said stem and extending longitudinally thereof, the coupling being movable longitudinally with the stem, pivotally connected members suspended from said coupling and movable toward and away from the valve seat by the coupling when in a lowered position, a valve member carried on the pivotally mounted members in facing relation to the valve seat, and means carried by said casing for holding the other pivoted member while the pivoted member carrying the valve member moves into position for seating the valve member against the seat and shutting off flow of fluid through the casing.

JOHN BODNOVICH.